US012697194B2

(12) United States Patent　　(10) Patent No.:　US 12,697,194 B2
Heo et al.　　(45) Date of Patent:　Aug. 4, 2026

(54) METHOD OF MANUFACTURING CROWN FOR DENTAL IMPLANT AND CROWN THEREBY

(71) Applicant: NEOBIOTECH, CO., LTD., Wonju-si (KR)

(72) Inventors: Young Ku Heo, Hanam-si (KR); Young Woo Jo, Yongin-si (KR)

( * ) Notice:　Subject to any disclaimer, the term of this patent is extended or adjusted under 35 U.S.C. 154(b) by 0 days.

(21) Appl. No.: 19/191,850

(22) Filed:　Apr. 28, 2025

(65)　　　Prior Publication Data

US 2025/0331967 A1　　Oct. 30, 2025

(30)　　Foreign Application Priority Data

Apr. 29, 2024　(KR) ........................ 10-2024-0056985

(51) Int. Cl.
A61C 13/083　　(2006.01)
A61C 5/77　　(2017.01)
(Continued)

(52) U.S. Cl.
CPC .............. *A61C 13/083* (2013.01); *A61C 5/77* (2017.02); *C04B 35/48* (2013.01); *C04B 35/64* (2013.01); *C04B 41/4535* (2013.01); *C04B 41/4578* (2013.01); *A61C 5/73* (2017.02); *B23P 15/00* (2013.01); *C04B 2235/3225* (2013.01); *C04B 2235/3246* (2013.01); *C04B 2235/612* (2013.01); *C04B 2235/656* (2013.01); *C04B 2235/661* (2013.01); *Y10T 29/49567* (2015.01)

(58) Field of Classification Search
CPC ........... A61C 5/73; A61C 5/77; A61C 13/081; A61C 13/083; C04B 2235/612; C04B 2235/3246; Y10T 29/49567; B23P 15/00
See application file for complete search history.

(56)　　　References Cited

U.S. PATENT DOCUMENTS 6,030,219 A　*　2/2000　Zuest ................. A61C 13/2656
　　　　　　　　　　　433/172
2012/0219930 A1 *　8/2012　Heinz .................. A61C 13/082
　　　　　　　　　　　433/215
(Continued)

FOREIGN PATENT DOCUMENTS

KR　　10-0912271　　8/2009
KR　　101773130 B1 *　8/2017　............. A61K 6/024
(Continued)

*Primary Examiner* — Jermie E Cozart

(57)　　　ABSTRACT

A method of manufacturing a crown for a detachable dental implant includes providing a first preliminary body including a preliminary space and a preliminary post extending downwardly from a ceiling of the preliminary space by using a block including zirconia. The method also includes machining an outer surface of the first preliminary body to form a second preliminary body including a preliminary chewing surface. The method additionally includes sintering the pre-machining crown to form a crown, in which through the sintering, the crown may include an accommodation space for accommodating an upper portion of a dental implant and a fixation post extending downwardly from a ceiling of the accommodation space. A dimensional ratio of the accommodation space to the preliminary space may be the same within an error of ±1% as a dimensional ratio of the fixation post to the preliminary post.

10 Claims, 8 Drawing Sheets

(51) Int. Cl.
  *C04B 35/48*    (2006.01)
  *C04B 35/64*    (2006.01)
  *C04B 41/45*    (2006.01)
  *A61C 5/73*     (2017.01)
  *B23P 15/00*    (2006.01)

(56)      References Cited

U.S. PATENT DOCUMENTS

| | | | | |
|---|---|---|---|---|
| 2015/0173869 A1* | 6/2015 | Jung | .................... | A61C 13/082 |
| | | | | 264/16 |
| 2018/0263740 A1* | 9/2018 | Jung | .................... | A61C 13/082 |
| 2019/0231651 A1* | 8/2019 | Ito | ......................... | A61K 6/818 |
| 2019/0321146 A1* | 10/2019 | Jung | ................. | A61C 13/0006 |
| 2020/0113660 A1* | 4/2020 | Jung | ................. | A61C 13/0022 |
| 2024/0000670 A1* | 1/2024 | Hara | ................... | C04B 41/0072 |

FOREIGN PATENT DOCUMENTS

| | | | | | |
|---|---|---|---|---|---|
| KR | 20200129837 A | * | 11/2020 | ........... | A61C 8/0069 |
| KR | 20230161112 A | * | 11/2023 | ........... | A61C 8/0075 |
| KR | 20230165404 A | * | 12/2023 | ........... | A61C 8/0048 |

* cited by examiner (a)

(b)

(c)

(a)

(b)

(a)

(b)

(c)

METHOD OF MANUFACTURING CROWN FOR DENTAL IMPLANT AND CROWN THEREBY

CROSS-REFERENCE TO RELATED APPLICATIONS

This application claims the priority of Korean Patent Application No. 10-2024-0056985 filed on Apr. 29, 2024, in the Korean Intellectual Property Office, the disclosure of which is incorporated herein by reference in its entirety.

BACKGROUND OF THE INVENTION

Field of the Invention

The present invention relates to a crown for a dental implant, and more particularly, to a method of manufacturing a crown, which integrally manufactures a crown and a crown thereby.

Description of the Related Art

Conventional dental implant systems may include a fixture implanted in the alveolar bone, an abutment fixed to the fixture, and a prosthesis bonded to the abutment. The prosthesis is integrally bonded to the abutment by an adhesive such as dental cement as an artificial tooth, and a screw hole is formed in the prosthesis to fix or separate the prosthesis to or from the fixture together with the abutment.

Korean Patent Registration No. 10-0912271 discloses a one-body abutment with a crown and a method of manufacturing the one-body abutment. A core portion forming the abutment and a porcelain portion forming the crown are separately manufactured, and the core portion and the porcelain portion are combined into a block body, and the porcelain is injected into the block body to form the one-body abutment with the crown.

Since the abutment and the crown are integrally formed, it can be said to be simple, but in practice, a complicated process called posserine injection is required, and in order to separate the crown once integrally fixed, a filling hole must be formed in a center of a chewing surface. In addition, the abutment or the crown needs to be detached and attached at any time during an overall procedure process of the implant, and if this is integrated, there is a problem that an installation error may occur every time the abutment and the crown are detached and attached.

SUMMARY OF THE INVENTION

The present invention has been made in an effort to provide a crown having a structure in which a block using zirconia is used, the crown is integrally formed to simplify an operation, and an integrated crown may be easily mounted and detached on an abutment or an implant, and a method of manufacturing the same.

The present invention has been made in an effort to provide a crown in which a fastening hole, etc., is not formed on a chewing surface in forming an integrated crown, and a method of manufacturing the same.

The present invention has been made in an effort to provide a crown in which processing, procedure, maintenance, and follow-up management are advantageous in a detachable dental implant including an integrated crown, and a method of manufacturing the same.

An exemplary embodiment of the present invention provides a method of manufacturing a crown for a detachable dental implant, which includes: providing a first preliminary body including a preliminary space and a preliminary post extending downwardly from a ceiling of the preliminary space by using a block including zirconia; machining an outer surface of the first preliminary body to form a second preliminary body including a preliminary chewing surface; and sintering the pre-machining crown to form a crown, in which through the sintering, the crown may include an accommodation space for accommodating an upper portion of a dental implant and a fixation post extending downwardly from a ceiling of the accommodation space, and a dimensional ratio of the accommodation space to the preliminary space may be the same within an error of +1% as a dimensional ratio of the fixation post to the preliminary post.

The block including zirconia may be formed to include yttria ($Y_2O_3$) and hafnium oxide ($HfO_2$) in addition to zirconia ($ZrO_2$) and may be specifically formed to include about 4.17 to 7.06 parts by weight of yttria ($Zro_2$) and about 4.17 and 5.88 parts by weight of hafnium oxide ($HfO_2$) to 100 parts by weight of zirconia ($ZrO_2$).

The block including zirconia may be designed so that the dimensional ratio of the accommodation space to the preliminary space and the dimensional ratio of the fixation post to the preliminary post are limited to 0.75 to 0.85. The block may form the crown by sintering the pre-machining crown, and allow the second preliminary body to generally shrink at a constant shrinkage rate.

In the block, it may be assumed that the second preliminary body is sintered at a temperature of about 1400 to 1650° C., and the block including zirconia configured as such may shrink at a predetermined ratio as a shrinkage rate of about 0.75 to 9.85 while being sintered the temperature of about 1400 to 1650° C.

A color liquid may be applied to a surface of the second preliminary body so that the crow has a similar color as natural teeth before sintering the second preliminary body.

In the forming of the crown, sintering may be performed two or more times. As an example, in order to form the crown, the second preliminary body may be subjected to primary sintering, the surface of the primarily sintered second preliminary body may partially be polished, or adjustments such as adjustment of color or gloss may be made, and the second preliminary body having the adjusted surface may be subjected to secondary sintering.

Here, the primary sintering may be performed at a temperature of about 1400 to 1650° C., and the secondary sintering may be performed at a temperature lower than that of the primary sintering, i.e., about 800 to 900° C.

In the forming of the second preliminary body, the preliminary chewing surface and an outer surface of the second preliminary body may be formed based on the preliminary post. Here, being based on the preliminary post may include that the outer surface of the second preliminary body may be cut or machined while the preliminary post is fixed to a jig or the like while the second preliminary body is formed, and also include cutting or machining the outer surface of the second preliminary body with a position of the preliminary post as a reference coordinate. Further, since the preliminary post and the like are used as a reference, a structure in which the preliminary chewing surface is closed without a hole may be provided.

In the second preliminary body, the preliminary post may be integrally formed with a body, the preliminary extension portion may be formed at a distal end portion located at a lower end of the preliminary post, and the preliminary close contact portion having a truncated pyramid or truncated cone shape may be formed at a proximal end portion located at an upper end.

In this specification, although the crown may be provided to have a complete tooth-like outer shape, in some cases, the crown having a structure including the accommodation space and the fixation post that may be coupled to the abutment portion may be implemented in a form in a natural gum or also provided in a form provided to have a semi-complete outer shape as an intermediate form expressed as teeth of a patient.

According to a crown for a dental implant and a method of manufacturing the same according to the present invention, a crown can be integrally formed by using a block using zirconia, an operation can be simplified by applying a CAD/CAM process, and an integrated crown can be easily mounted and detached on an abutment or an implant.

According to a crown for a dental implant and a method of manufacturing the same according to the present invention, the use of a resin in a process of a procedure can be minimized without forming a fastening hole, etc., on a chewing surface in forming an integrated crown.

According to a crown for a dental implant and a method of manufacturing the same according to the present invention, an integrated crown can be used, and processing, procedure, maintenance, and follow-up management are advantageous in a detachable dental implant.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
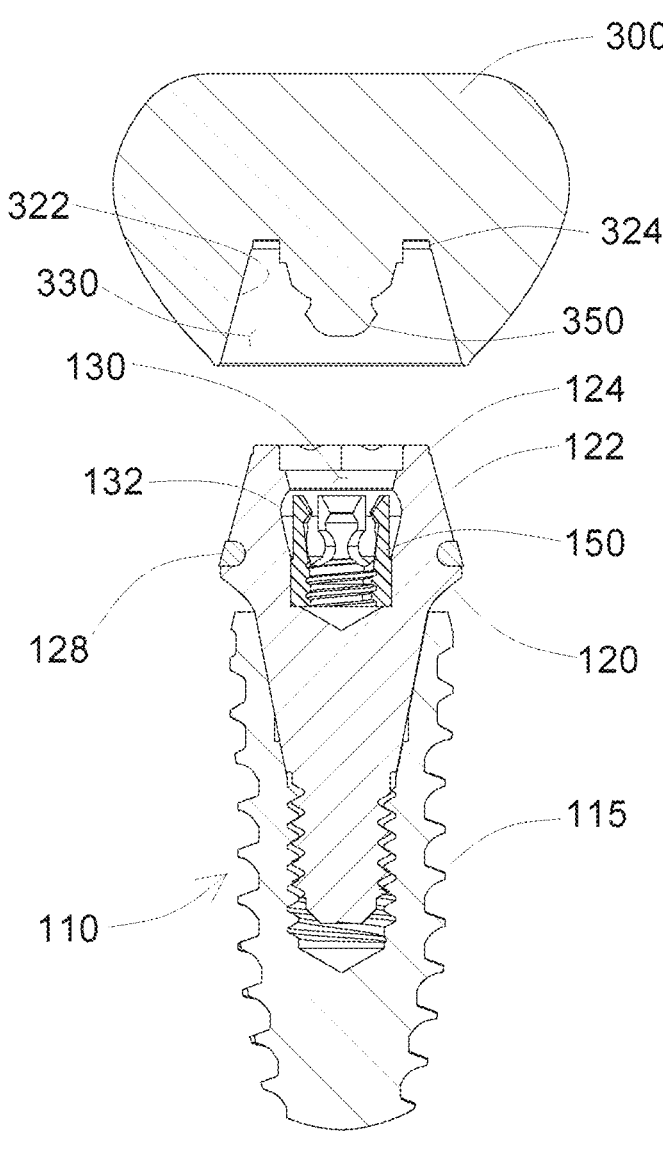
FIGS. 1 and 2 are diagrams for explaining a crown of a detachable dental implant and a mounting process thereof according to an exemplary embodiment of the present invention.

Hereinafter, exemplary embodiments of the present invention will be described in detail with reference to the accompanying drawings, but the present invention is not limited or restricted to the exemplary embodiments. For reference, in the description, like reference numerals substantially refer to like elements, which may be described by citing contents disclosed in other drawings under such a rule and contents determined to be apparent to those skilled in the art or repeated may be omitted.

Figure 2:
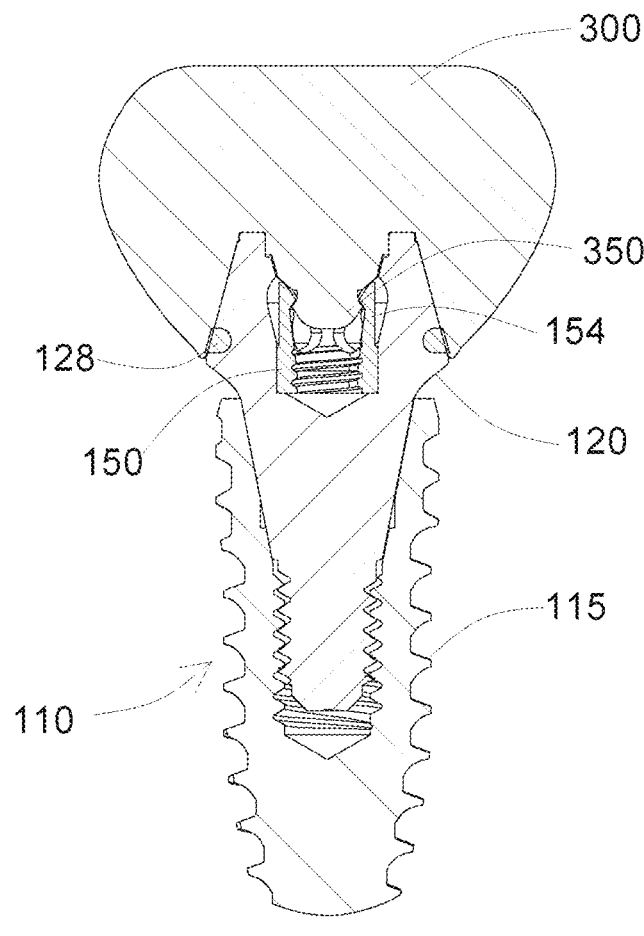
Figure 3:
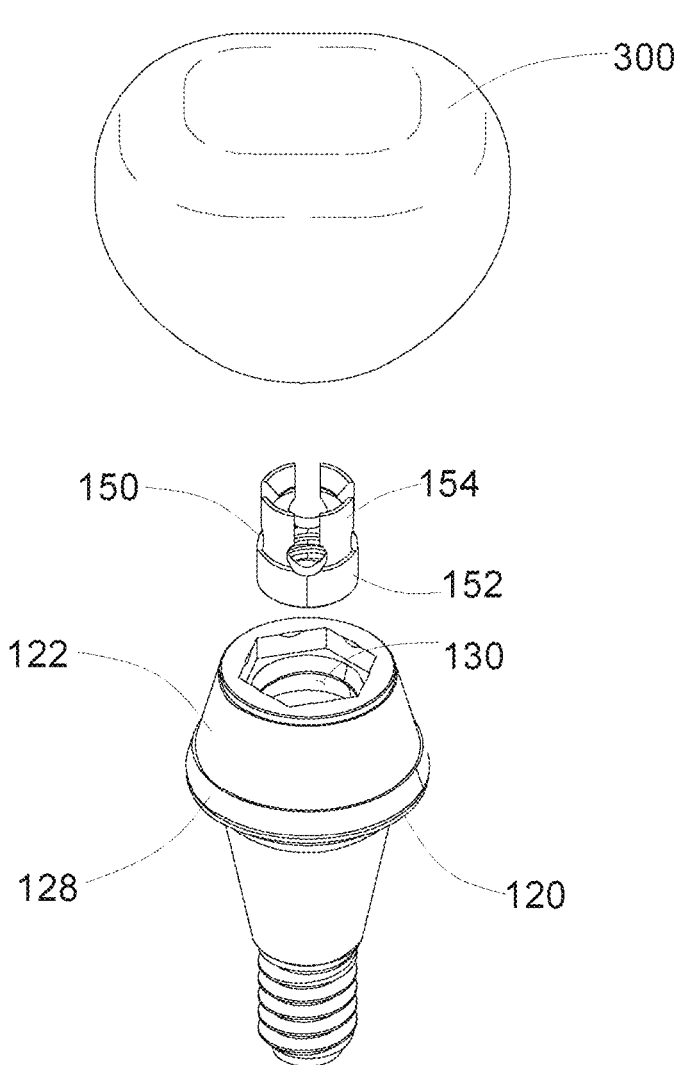
FIG. 3 is a diagram for describing a coupling of the crown of FIG. 1 and an implant body, and a shape of an elastic coupling portion.
Figure 5:
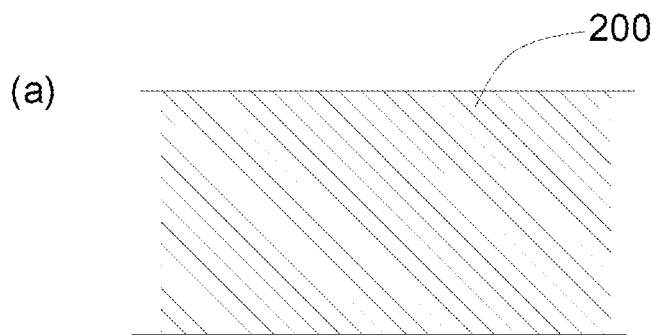
FIGS. 5(a)-(c) are diagrams for describing a cutting process of the crown for the detachable dental implant according to an exemplary embodiment of the present invention.
Figure 5:
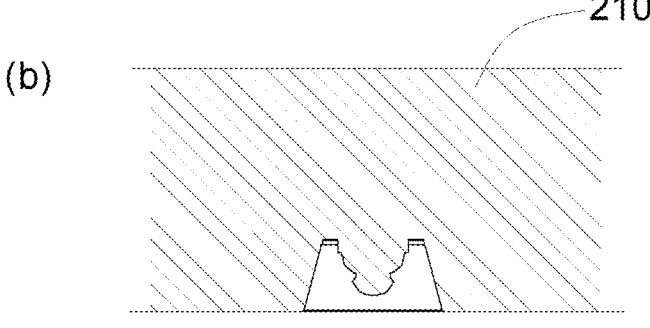
Figure 5:
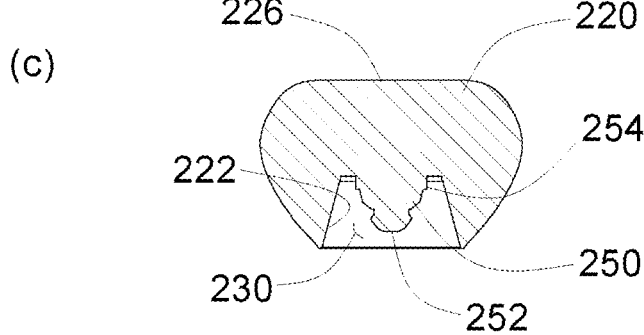
Figure 6:
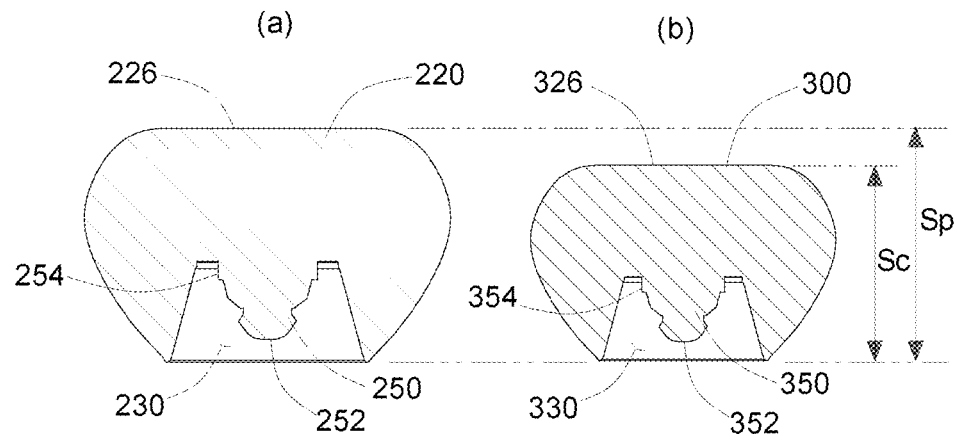
FIGS. 6(a)-(b) are diagrams for describing a process of forming and sintering the crown for the detachable dental implant according to an exemplary embodiment of the present invention.

FIGS. 1 and 2 are diagrams for explaining a crown of a detachable dental implant and a mounting process thereof according to an exemplary embodiment of the present invention, FIG. 3 is a diagram for describing a coupling of the crown of FIG. 1 and an implant body, and a shape of an elastic coupling portion, FIGS. 4(a)-4(f) are diagrams for describing a manufacturing method of a crown for a detachable dental implant according to an exemplary embodiment of the present invention, FIGS. 5(a)-5(c) are diagrams for describing a cutting process of the crown for the detachable dental implant according to an exemplary embodiment of the present invention, and FIGS. 6(a)-6(b) are diagrams for describing a process of forming and sintering the crown for the detachable dental implant according to an exemplary embodiment of the present invention.

Referring to FIGS. 1 to 6(b), a detachable dental implant according to an exemplary embodiment of the present invention may include an implant body 110 including an implantation portion 115 and an abutment portion 120, and an integral crown 300.

The implant body 110 is configured to be implanted in an alveolar bone by using the implantation portion 115, and when the implant body 110 is implanted, the integrated crown 300 may be fixed through an upper abutment portion 120 without screwing through an elastic coupling portion 150.

In the exemplary embodiment, the implantation portion 115 and the abutment portion 120 are separated from each other and coupled to each other in an internal scheme, but may be coupled to each other in an external scheme or may be integrally formed with each other.

The implant body 110 may be formed using a titanium material, and the integral crown 300 may be formed in a process of CAD/CAM machining and sintering a block comprising zirconia.

In the exemplary embodiment, the abutment portion 120 may be coupled to an upper portion of the implant body 110, and the implantation portion 115 may be formed at a lower portion in a form of a screw. Since the implant body 110 is implanted in the alveolar bone, the implant body 110 may be affected by various variables depending on a physical condition or surgical condition of a patient, and an implanted position, angle, or the like may be changed even after implantation and in the process of stabilization. For example, a condition of osseointegration of the implantation portion may be changed by a bite force.

The abutment portion 120 may provide a horn-shaped outer inclined surface 122 and an open-topped inner space 130. The elastic coupling portion 150 may be press-fitted into the inner space 130, and a fixation column 350 of the crown 300 may enter to mutually engage the crown 300 and the abutment portion 120.

The elastic coupling portion 150 may include a cylindrical lower base 152 and four elastic legs 154 extending upwardly from the lower base 152. The elastic legs 154 may be disposed around ends of a fixation post 350 and may act like a cantilever to fix the ends of the fixation post 350.

A female thread may be formed on an inner surface of the lower base 152, and an inner screw that fits the female thread may enter to spread the elastic leg 154, so that a coupling force between the fixation post 350 and the elastic coupling portion 150 may be temporarily adjusted.

As illustrated in FIGS. 1 and 2, the fixation post 350 may be located at a center of a ceiling of an accommodating space 330 of the integrated crown 300, and the elastic coupling portion 150 may be press-fitted and fixed inside the inner space 130 of the abutment portion 120.

The crown 300 may have a downwardly open accommodation space 330, and an outer surface thereof may be provided in a shape of an artificial tooth to be fixed to an implant. An upper portion of the abutment portion 120 is accommodated in the accommodating space 330, and may form an inner inclined surface 322 facing the outer inclined surface 122 of the abutments portion 120.

The end of the fixation post 350 may be provided with a relatively large dimensioned and bluntly formed extension portion 352. The elastic coupling portion 150 may be fixed to a bottom of the inner space 130, and an end of the elastic leg 154 may wrap around and fix the extension portion 352 of the fixation post 350 while the fixation post 350 enters between the elastic legs 154 of the elastic coupling portion 150. The elastic leg 154 may temporarily retract towards a peripherally formed clearance groove and then return to an original position thereof.

While the outer inclined surface 122 of the abutment portion 120 and the inner inclined surface 322 of the crown 300 are guided to each other in the process of coupling the crown 300 and the abutment portion 120, the outer inclined surface 122 and the inner inclined surface 322 may stably enter each other even when central axes of the abutment portion 120 and the crown 300 are displaced.

A first landing coupling surface 124, which is separated from the outer inclined surface 122, may be formed on an upper end of the outer inclined surface 122 of the abutment portion 120. In addition, a second landing coupling surface 324 corresponding to the first landing coupling surface 124 may also be formed on an upper end of the inner inclined surface 322 of the crown 300.

The first landing coupling surface 124 and the second landing coupling surface 324 provide surfaces that are substantially perpendicular compared to the inclined outer inclined surface 122 and the inner inclined surface 322, and are in close contact with each other in a final process of coupling the crown 300 and the abutment portion 120, so that the crown 300 and abutment portion 102 may be firmly fixed.

The abutment portion 120 and the crown 300 may be stably fixed while the first landing coupling surface 124 and the second landing coupling surface 324 are coupled to each other at an innermost end of the accommodating space 330, and the crown 300 and the like may be prevented from rotating with respect to the abutment portion 130 even with respect to lateral pressure.

Unlike the first landing coupling surface 124, the second landing coupling surface 324 is not a completely vertical surface and may be formed to be slightly inclined at an angle β greater than 0 degree and equal to or less than 5 degrees. Of course, it is also possible, if necessary, for only the first landing coupling surface to be slightly inclined or for both to be inclined at the same or different angle.

The lower portion of the outer inclined surface 122 may be annularly formed with a groove capable of accommodating an O-ring 128, and the O-ring 128 may be mounted in the groove. The O-ring 128 may prevent foreign matter from entering between the outer inclined surface 122 and the inner inclined surface 322, and the O-ring 128 may prevent wear or chipping from occurring in the crown 300 and the abutment portion 120.

A cross-section of the O-ring 128 may include a planar portion that is formed in semicircular shape inwardly but faces outwardly. The O-ring 128, when formed non-circularly, may minimally protrude from the outer inclined surface 122, while increasing a contact area between the O-ring 128 and the inner inclined surface 322 to effectively block foreign objects.

The O-ring 128 may prevent foreign matter from entering between the crown 300 and the abutment portion 120, but may adversely affect a frictional force due to a surface contact between the outer inclined surface 122 and the inner inclined surface 322. However, if the coupling force of the elastic coupling portion 150 is increased, excessive force may be applied when the crown 300 is separated from the abutment portion 120 or the implant body 110, and the excessive force may damage a surrounding tissue. In addition, mounting and dismounting may be necessary from time to time to set the crown 300 and the prosthesis 20 during the procedure, and the need for excessive force when separating the crown 300 and the prosthesis 30 may mean that an overall procedure itself is made difficult. In order to solve this problem, in the implant according to the exemplary embodiment, the internal screw described above may be used.

Although the O-ring 128 is provided between the crown 300 and the abutment portion 120 in the exemplary embodiment, the O-ring may not be provided, and it is also possible that a locking projection, a shoulder, or the like is formed on the lower portion of the outer inclined surface of the abutment portion.

When pre-operations related to mounting and separation are completed during the implantation procedure, and finally the crown 300 is permanently fixed to the implant body 110, an operator may completely remove the inner screw from the inner space 130, and through the removal of the inner screw, a restoring force and the coupling force originally possessed by the elastic coupling portion 150 may also be strongly restored.

In the ceiling of the accommodating space 330, a hexagonal column-shaped close contact portion 354 may be formed around an upper end, i.e., the proximal end portion, of the fixation post 350. A hexagonal column-shaped groove corresponding to a hexagonal column shape may be formed on an upper surface of the abutment portion 120.

It is also possible to form a feeder edge that is widened more outwardly than the inner inclined surface 322 below the inner inclined surface 322 of the crown 300. Through the feeder edge, the upper end of the abutment portion 120 may be more easily guided into the accommodating space 330.

Hereinafter, a manufacturing process of the crown 300 will be described with reference to FIGS. 4(*a*) to 6(*b*).

Figure 4:
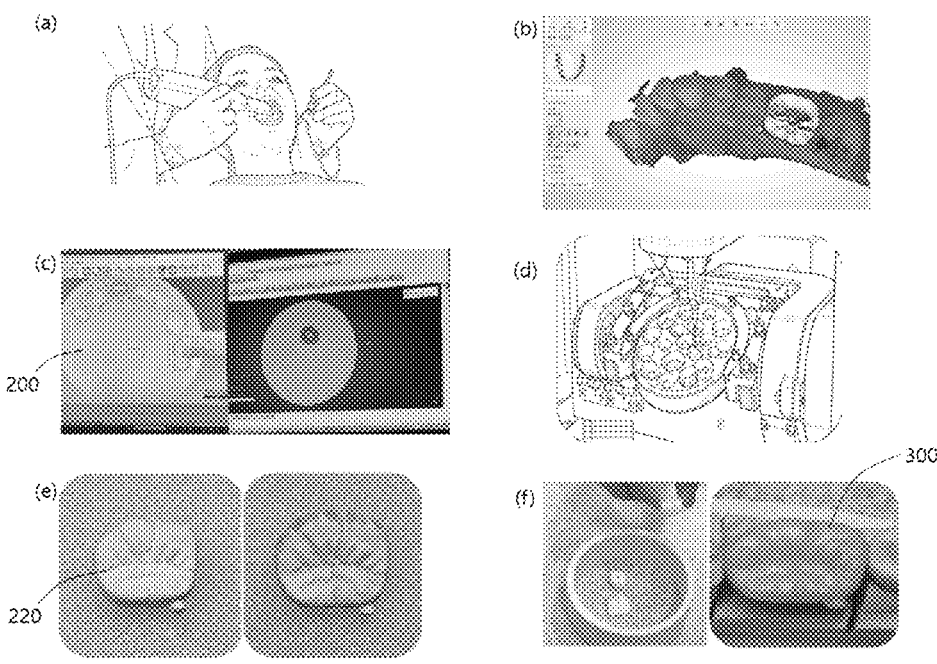
FIGS. 4(a)-(f) are diagrams for describing a manufacturing method of a crown for a detachable dental implant according to an exemplary embodiment of the present invention.

In order to form the crown 300, an impression of the patient may be taken before or after extraction and an operation model may be fabricated in 3D, the impression taking may be obtained by using gypsum or the like or through 3D scanning (FIG. 4(*a*)), and the obtained information of the three-dimensional shape may be used to virtually reproduce an oral structure of the patient (FIG. 4(*b*)).

In addition, a shape of the crown 300 to be newly provided may be designed by a CAD program using the oral structure of the patient, and an implantation process of the patient may be modeled.

In the exemplary embodiment, a block 200 including zirconia may be used in order to manufacture the crown.

First, by using the block 200, a first preliminary body 210 may be provided, which includes a preliminary space 230 and a preliminary post 250 extended downwardly from a ceiling of the preliminary space 230.

The first preliminary body 210 may be formed at the same time as the second preliminary body 220 to be described later, but since the first preliminary body 210 may be fixed by using the preliminary post 250 and the preliminary space 230 of the first preliminary body 210, the first preliminary body 210 may be formed first, and the second preliminary body 220 may also be formed through post-processing in a state in which the first preliminary body 210 is fixed.

The block 200 may be provided in a cube shape to form one crown 300, but in a disc shape to form a crown connected by a bridge or the like.

The block 200 may be formed to include yttria ($Y_2O_3$) and hafnium oxide ($HfO_2$) in addition to zirconia ($ZrO_2$) and may be specifically formed to include about 4.17 to 7.06 parts by weight of yttria ($ZrO_2$) and about 4.17 and 5.88 parts by weight of hafnium oxide ($HfO_2$) to 100 parts by weight of zirconia ($ZrO_2$).

Assuming that the block 200 thus formed is sintered at a temperature of about 1400 to 1650° C., it may be expected that the machined body shrinks at a uniform shrinkage of about 0.75 to 0.85.

After or at the same time as forming the first preliminary body 210, the second preliminary body 220 may be formed, which includes a preliminary chewing surface 226.

As illustrated in FIGS. 6(a)-6(b), the second preliminary body 220 may be formed to a size (Sp/Sc) of about 120% of the finished crown 300, and through the sintering process, the second preliminary body 220 may be uniformly shrunk in dimension to the crown 300 (Sp→Sc). Corresponding to the accommodation space 330, the fixation post 350, the expanding portion 352, and the close contact portion 354 of the crown 300, the second preliminary body 220 may include a preliminary space 230, a preliminary post 250, a preliminary extension portion 252, and a preliminary close contact portion 254.

In the exemplary embodiment, a dimensional ratio of the accommodation space 330 to the preliminary space 230 in the exemplary embodiment may be the same within an error of ±1% as the dimensional ratio of the fixation post 350 to the preliminary post 250.

As in FIG. 4(e), a color liquid may be applied to a surface of the second preliminary body 220 so that the crown 300 has a color similar to natural teeth before sintering the second preliminary body 200.

In a step of forming the crown 300 by sintering, sintering may be performed two or more times. As an example, in order to form the crown 300, the second preliminary body may be subjected to primary sintering, the surface of the primarily sintered second preliminary body may partially be polished, or adjustments such as adjustment of color or gloss may be made, and the second preliminary body having the adjusted surface may be subjected to secondary sintering.

Here, the primary sintering may be performed at a temperature of about 1400 to 1650° C., and the secondary sintering may be performed at a temperature lower than that of the primary sintering, i.e., about 800 to 900° C.

Referring to FIG. 4(d) and FIGS. 5(b) and 5(c), in the step of forming the second preliminary body 220, the preliminary chewing surface 226 and an outer surface of the second preliminary body 200 may be formed based on the preliminary post 250. Here, being based on the preliminary post 250 may include that the outer surface of the second preliminary body 220 may be cut or machined with a CAM while the preliminary post 250 is fixed to a jig or the like while the second preliminary body 22 is formed. Alternatively, as in FIG. 4(d), the outer surface of the second preliminary body 220 may be cut or machined with a position of the preliminary post 250 as a reference coordinate. Since the preliminary post 250 and the like are used as a reference, a structure in which the preliminary chewing surface 226 and the crown chewing surface 326 are closed without a hole may be provided in the exemplary embodiment.

Referring to FIGS. 6(a)-6(b), in the exemplary embodiment, in the second preliminary body 220, the preliminary post 250 is integrally formed with a body, the preliminary extension portion 252 may be formed at a distal end portion located at a lower end of the preliminary post 250, and the preliminary close contact portion 254 having a truncated pyramid or truncated cone shape may be formed at a proximal end portion located at an upper end.

Figure 7:
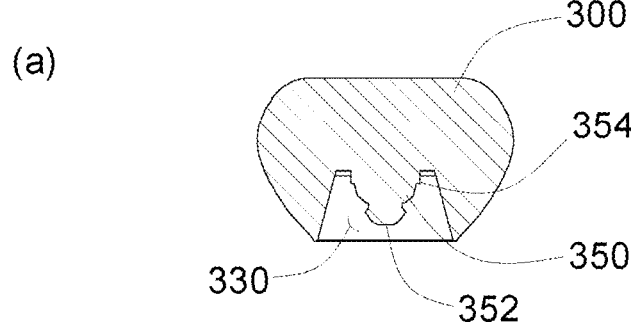
FIGS. 7(a)-(b) are diagrams for describing various examples of the crown for the detachable dental implant according to an exemplary embodiment of the present invention.
Figure 7:
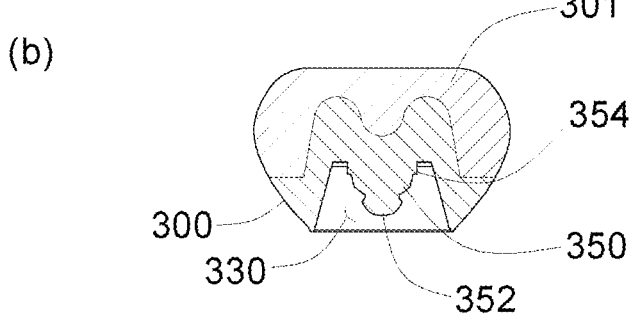

FIGS. 7(a)-7(b) are diagrams for describing various examples of the crown for the detachable dental implant according to an exemplary embodiment of the present invention. Although the crown 300 is provided in FIG. 7(a) to have a complete tooth-like outer shape, the crown 300 having a semi-complete outer shape as a structure including the accommodation space 330 and the fixation post 350 that may be coupled to the abutment portion may be provided in FIG. 7(b). On top of the crown 300 having the semi-complete outer shape, a crown cover 301 having a complete tooth-like outer shape may be provided, and the crown cover 301 may also be made of the same zirconia or other material as the crown 300.

Figure 8:
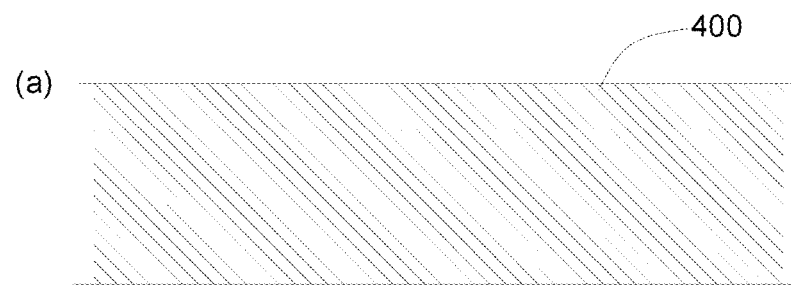
FIGS. 8(a)-(c) are diagrams for describing a cutting process of the crown for the detachable dental implant according to an exemplary embodiment of the present invention.
Figure 8:
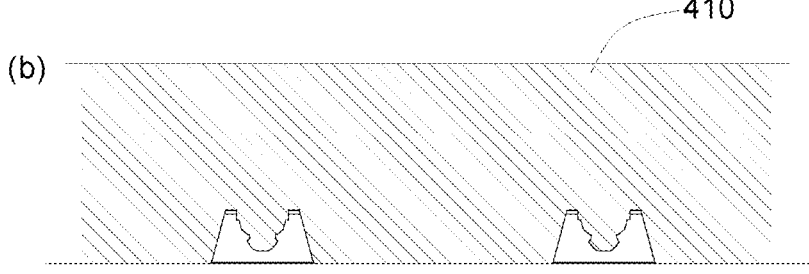
Figure 8:
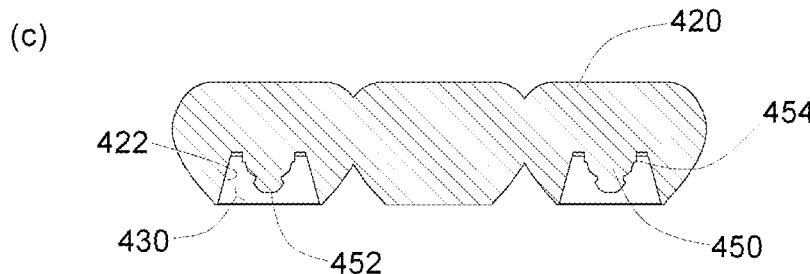

FIGS. 8(a)-8(c) are diagrams for describing a cutting process of the crown for the detachable dental implant according to an exemplary embodiment of the present invention.

Referring to FIGS. 8(a)-8(c), two or more preliminary spaces 430 and preliminary posts 450 may be formed in a block 400, and multiple crowns connected by a bridge may be formed by using the preliminary spaces and the preliminary posts. In this case, when disk-shaped blocks illustrated in FIGS. 4(c) and 4(d) are used, the multiple crowns may be designed through a design layout using software.

Preferably, the same preliminary space 430 and preliminary post 450 may be formed at two separate points to form the first preliminary body 410, and the second preliminary body 420 having an outer surface of the artificial tooth may be subjected to CAM processing after or at the same time as the formation of the first preliminary body 410.

In addition, the preliminary space 430, the preliminary post 450, the extension portion 452, and the close contact portion 454 may refer to a previous description, and the close contact portion 454 may be formed in a polygonal column shape, a truncated cone shape, or the like.

Then, the multiple-connected second preliminary body 420 may be sintered to form multiple crowns. In consideration of shrinkage during sintering, a shrinkage rate of the multiple crown relative to the second preliminary body 420 may be designed at a uniform shrinkage rate of about 0.75 and 0.85.

As described above, in the case of forming the multiple crown, the feeder edge formed at the lower end of the accommodation space may be used to more easily guide the first landing coupling surface or the like of the abutment portion into the inside of the accommodation space, and fastening may be easily completed even if the abutment portion enters at a twisted angle with minimal locking.

As described above, the present invention has been described with reference to the preferred exemplary embodiments. However, it will be appreciated by those skilled in the art that various modifications and changes of the present invention can be made without departing from the spirit and the scope of the present invention which are defined in the appended claims and their equivalents.

What is claimed is:

1. A method of manufacturing a crown for a detachable dental implant, the method comprising:

providing a first preliminary body including a preliminary space and a preliminary post extending downwardly from a ceiling of the preliminary space by using a block including zirconia;

machining an outer surface of the first preliminary body to form a second preliminary body including a preliminary chewing surface; and sintering the second preliminary body to form a crown, wherein through the sintering, the crown includes an accommodation space for accommodating an upper portion of a dental implant and a fixation post extending downwardly from a ceiling of the accommodation space, and a dimensional ratio of the accommodation space to the preliminary space is the same within an error of ±1% as a dimensional ratio of the fixation post to the preliminary post.

2. The method of manufacturing a crown for a detachable dental implant of claim 1, wherein the block is formed to include zirconia ($ZrO_2$), yttria ($Y_2O_3$), and hafnium oxide ($HfO_2$).

3. The method of manufacturing a crown for a detachable dental implant of claim 2, wherein the block is formed to include 4.17 to 7.06 parts by weight of yttria ($Y_2O_3$) and 4.17 to 5.88 parts by weight of hafnium oxide ($HfO_2$) with respect to 100 parts by weight of zirconia ($ZrO_2$).

4. The method of manufacturing a crown for a detachable dental implant of claim 1, wherein the dimensional ratio of the accommodation space to the preliminary space and the dimensional ratio of the fixation post to the preliminary post are limited to 0.75 to 0.85.

5. The method of manufacturing a crown for a detachable dental implant of claim 1, wherein in the sintering of the pre-machining crown to form the crown, the second preliminary body is sintered at a temperature of 1400 to 1650° C.

6. The method of manufacturing a crown for a detachable dental implant of claim 1, further comprising:

applying a color liquid to a surface of the preliminary body before sintering the second preliminary body.

7. The method of manufacturing a crown for a detachable dental implant of claim 1, wherein in the forming of the crown, the second preliminary body is primarily sintered, the surface of the primarily sintered second preliminary body is adjusted, and the second preliminary body of which surface is adjusted is secondarily sintered.

8. The method of manufacturing a crown for a detachable dental implant of claim 7, wherein the primary sintering is performed at a temperature of 1400 to 1650° C., and the secondary sintering is performed at a temperature of 800 to 900° C.

9. The method of manufacturing a crown for a detachable dental implant of claim 1, wherein in the forming of the second preliminary body, the preliminary chewing surface and an outer surface of the second preliminary body are formed based on the preliminary post, and the preliminary chewing surface is closed without a hole.

10. The method of manufacturing a crown for a detachable dental implant of claim 1, wherein the preliminary post is formed integrally with the second preliminary body, and includes a preliminary extension portion formed at a distal end portion and a preliminary close contact portion having a truncated pyramid or truncated cone shape formed at a proximal end portion.

* * * * *